US011100928B2

(12) United States Patent
Cordell et al.

(10) Patent No.: US 11,100,928 B2
(45) Date of Patent: *Aug. 24, 2021

(54) CONFIGURATION FOR SIMULATING AN INTERACTIVE VOICE RESPONSE SYSTEM FOR LANGUAGE INTERPRETATION

(71) Applicant: Language Line Services, Inc., Monterey, CA (US)

(72) Inventors: Jeffrey Cordell, Carmel, CA (US); James Boutcher, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 16/411,579

(22) Filed: May 14, 2019

(65) Prior Publication Data

US 2020/0365147 A1 Nov. 19, 2020

(51) Int. Cl.
| | |
|---|---|
| *G10L 15/22* | (2006.01) |
| *G10L 15/00* | (2013.01) |
| *G06T 13/40* | (2011.01) |
| *H04M 3/493* | (2006.01) |
| *G06T 13/20* | (2011.01) |
| *G06F 40/58* | (2020.01) |

(52) U.S. Cl.
CPC .............. *G10L 15/22* (2013.01); *G06F 40/58* (2020.01); *G06T 13/205* (2013.01); *G06T 13/40* (2013.01); *G10L 15/005* (2013.01); *H04M 3/4936* (2013.01); *G10L 2015/223* (2013.01)

(58) Field of Classification Search
USPC ............... 704/231, 246, 247, 251, 252, 275
See application file for complete search history.

(56) References Cited

U.S. PATENT DOCUMENTS

| | | | | |
|---|---|---|---|---|
| 9,189,742 | B2 * | 11/2015 | London | G06N 5/04 |
| 9,948,778 | B2 * | 4/2018 | de Silva | H04M 7/0078 |
| 10,565,509 | B2 * | 2/2020 | London | G06Q 10/10 |
| 2008/0109208 | A1 * | 5/2008 | Curry | G09B 5/12 |
| | | | | 704/3 |

(Continued)

*Primary Examiner* — Leonard Saint Cyr
(74) *Attorney, Agent, or Firm* — Patent Ingenuity, P.C.; Samuel K. Simpson (57) ABSTRACT

A configuration is implemented to establish, with a processor, an interactive voice response system that is operable in a first human-spoken language. Further, the configuration receives, with the processor, a communication request through a designated communication channel for a second human-spoken language. The second human-spoken language is distinct from the first human-spoken language. Moreover, the configuration generates, with the processor, a simulated interactive voice response system that provides a service in the second human-spoken language. The simulated interactive voice response system routes a request in the second human-spoken language to a machine interpreter that translates the request into the first human-spoken language. The translated request is provided to the interactive voice response system to process the request in the first human-spoken language. Further, the processed request is translated by the machine interpreter for output by the simulated interactive voice response system as the service in the second human-spoken language.

18 Claims, 9 Drawing Sheets

(56) References Cited

U.S. PATENT DOCUMENTS

| | | | |
|---|---|---|---|
| 2008/0140422 A1* | 6/2008 | Hovestadt | G10L 15/26 704/275 |
| 2016/0117593 A1* | 4/2016 | London | G06F 40/58 706/11 |
| 2017/0374198 A1* | 12/2017 | de Silva | H04L 51/02 |
| 2019/0139430 A1* | 5/2019 | Ghatage | G09B 7/02 |
| 2020/0012724 A1* | 1/2020 | Kawatake | G10L 15/005 |

* cited by examiner

CONFIGURATION FOR SIMULATING AN INTERACTIVE VOICE RESPONSE SYSTEM FOR LANGUAGE INTERPRETATION

BACKGROUND

1. Field

This disclosure generally relates to the field of language interpretation. More particularly, the disclosure relates to a computerized system that provides spoken-language interpretation via an audio-based device.

2. General Background

A variety of service providers (e.g., banks, insurance companies, etc.) typically allow a user to obtain account information by placing a telephone call to a service center associated with the service provider, and speaking with a live customer care agent. Yet, having a live customer care agent available to assist a customer with various questions/tasks, ranging from simple to complex, can lead to the service provider having to expend significant resources.

As a result, service providers have attempted to develop automated systems to curtail human resource expenditures. However, conventional automated systems have been typically developed for operational use with one particular human spoken-language (e.g., English). For instance, a user speaking a language other than English, which is referred to herein as a limited English proficiency user ("LEP"), may call a service provider whose automated system is only capable of providing a service in English. As a result, for even the most rudimentary tasks regarding a user's account, a server provider typically had to connect the LEP to an English-speaking customer care agent and a human language interpreter to provide language interpretation for the service requested by the LEP. In other words, rather than using the cost-effective automated system, the service provider had to make two human resource expenditures for the LEP telephone call: a customer service agent expenditure and a language interpreter expenditure.

To help alleviate the foregoing, service providers sometimes have an additional commonly-spoken language built into their automated system platforms. For example, some English-speaking service providers have added an option in their automated systems for Spanish speakers; yet, such an addition is a change to infrastructure that is often time-intensive and resource-intensive. As a result, many service providers build in, at most, one additional language into their automated system platforms, leaving the vast majority of languages spoken throughout the world unaccounted for by automated systems.

Thus, conventional automated systems are not utilized in an optimal manner by service providers that provide services to users speaking a variety of different human-spoken languages.

SUMMARY

A configuration is implemented to establish, with a processor, an interactive voice response system ("IVR") that is operable in a first human-spoken language. Further, the configuration receives, with the processor, a communication request through a designated communication channel for a second human-spoken language. The second human-spoken language is distinct from the first human-spoken language. Moreover, the configuration generates, with the processor, a simulated IVR that provides a service in the second human-spoken language. The simulated IVR routes a request in the second human-spoken language to a machine interpreter that translates the request into the first human-spoken language. The translated request is provided to the IVR to process the request in the first human-spoken language. Further, the processed request is translated by the machine interpreter for output by the simulated IVR as the service in the second human-spoken language.

In one embodiment, the configuration is implemented via computer executable instructions that are stored on a computer readable device. In another embodiment, the configuration is implemented as a process. In yet another embodiment, the configuration may be implemented via a system that utilizes the processor, which may be specialized for generating the simulated IVR.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A configuration is provided for simulating an IVR for language interpretation. In essence, the configuration augments an existing IVR that is configured to provide a service in a first human-spoken language to provide the appearance of a distinct IVR that provides the service in a second human-spoken language. In other words, the configuration simulates an IVR in the second human-spoken language so that an LEP perceives that he or she is interacting with an IVR in his or her human-spoken language, even though an actual IVR in the second human-spoken language has not been physically implemented by the service provider. The configuration improves the functioning of a computer by alleviating resource allocations for physical computerized implementations capable of servicing a variety of different spoken languages; rather, the configuration augments an existing computerized implementation with a computerized language interpretation configuration that performs the foregoing simulation.

Figure 1A:
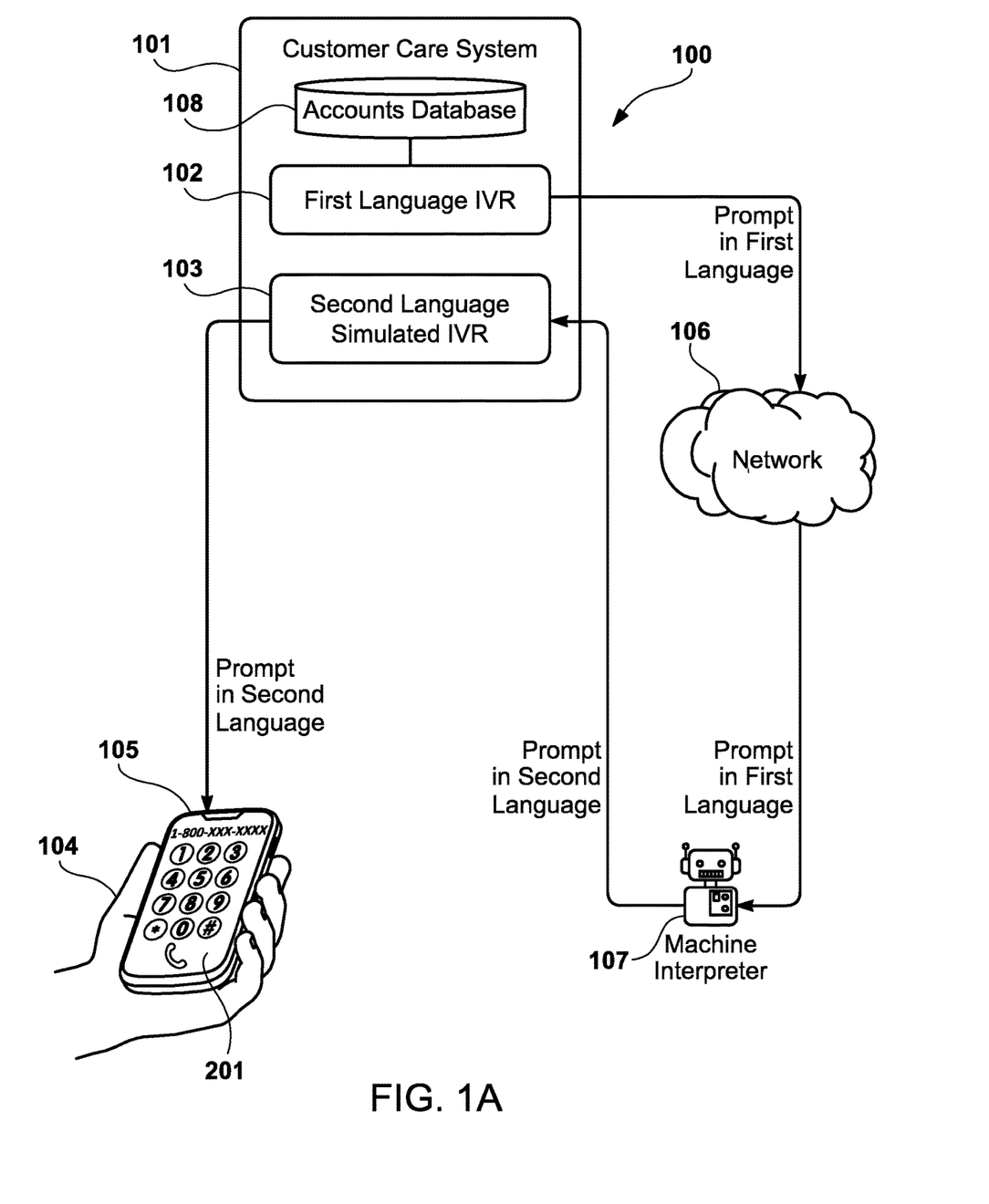
FIG. 1A illustrates a user utilizing a mobile computing device to place a telephone call to a customer care system, which corresponds to a service provider.
Figure 1B:
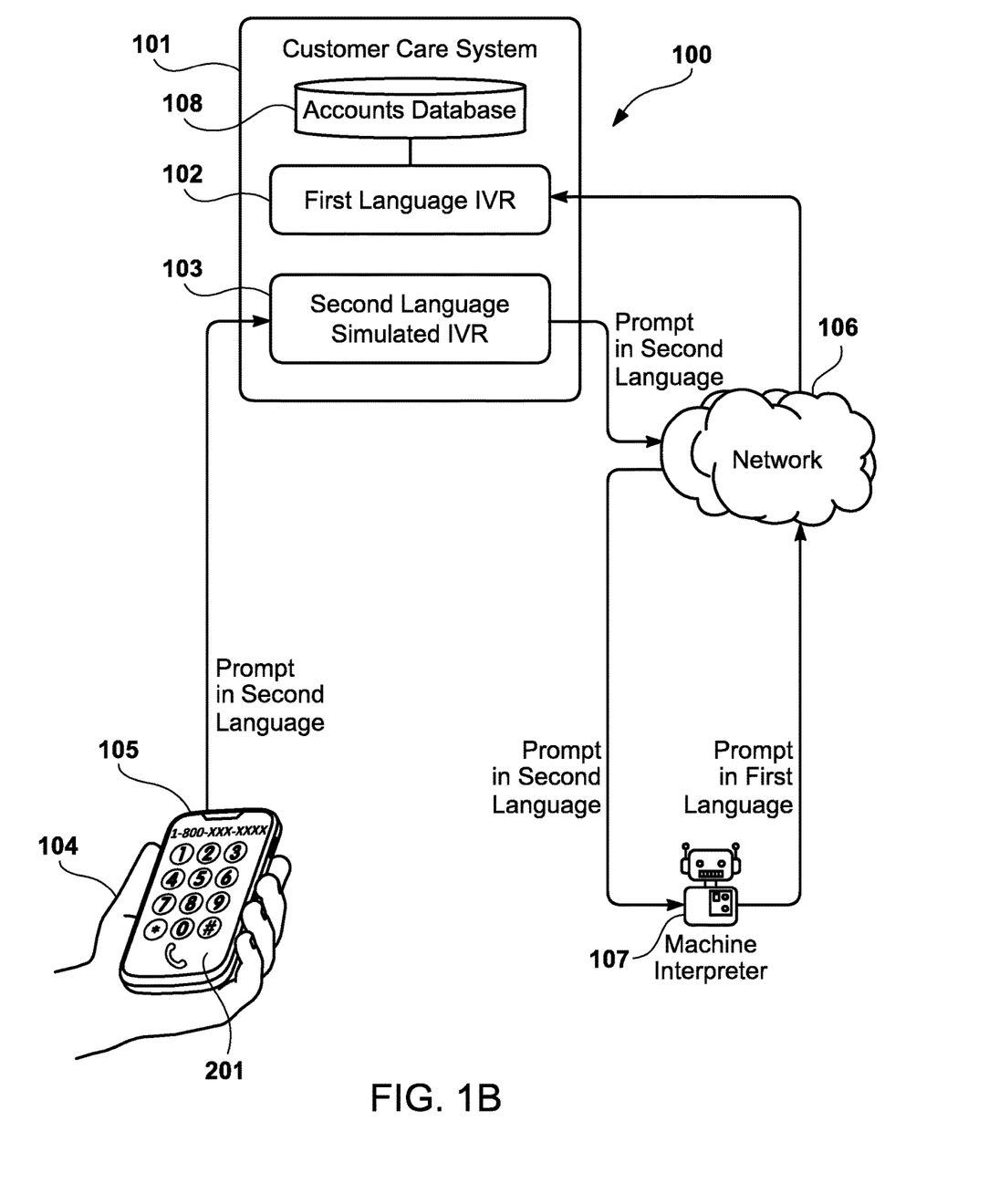
FIG. 1B illustrates a continuation of the example workflow illustrated in FIG. 1A.
Figure 1C:
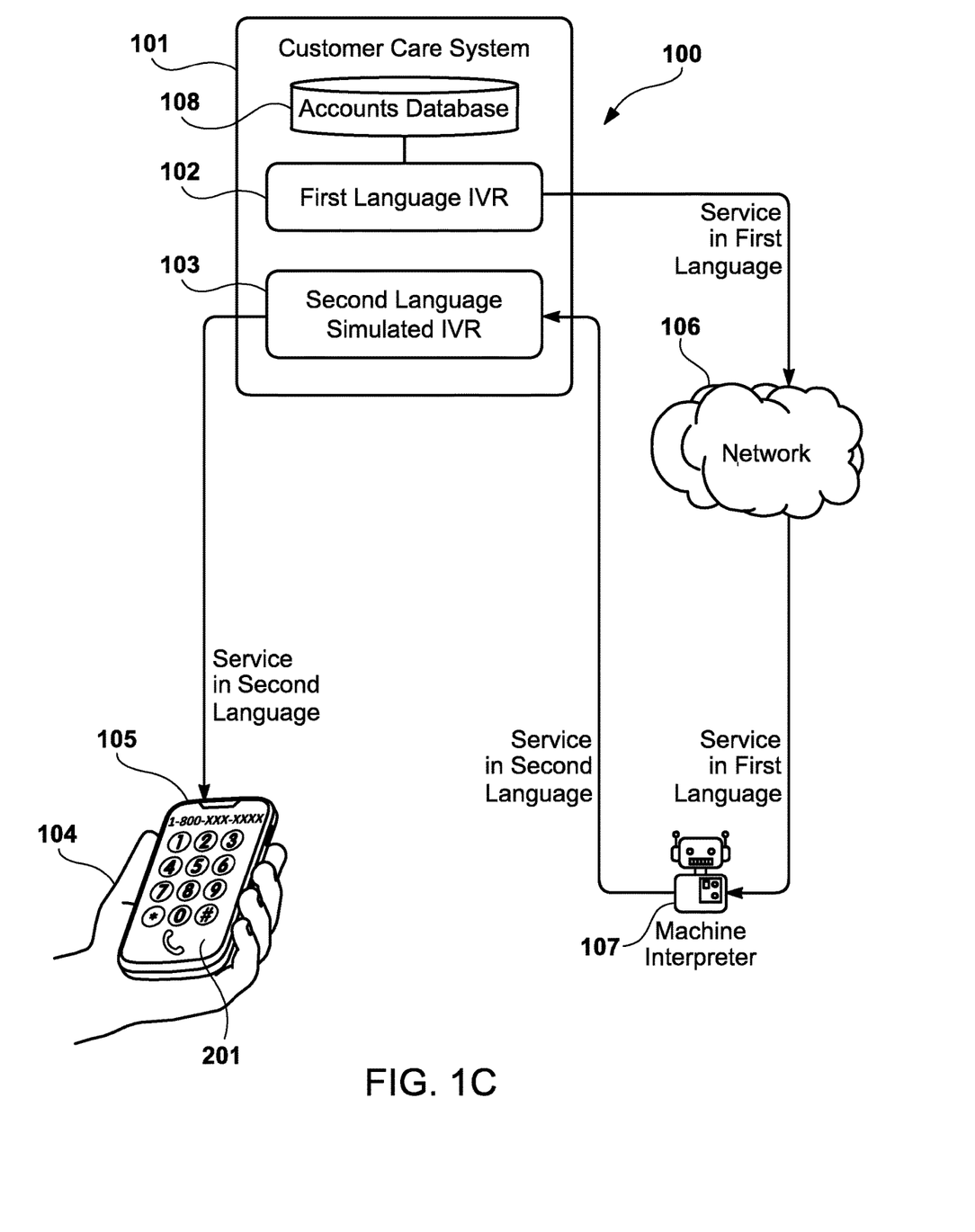
FIG. 1C illustrates the first language IVR providing a service through the network to the machine interpreter.

FIGS. 1A-1C illustrate an example of a sequence of events performed by a simulated IVR configuration 100 when a user 104 initially places a telephone call to a customer care system 101. In particular, FIG. 1A illustrates the user 104 utilizing a mobile computing device 105 (e.g., smartphone, tablet device, etc.) to place a telephone call to the customer care system 101, which corresponds to a service provider. (Although a mobile computing device 105 is illustrated, a stand-alone telecommunication device (e.g., landline telephone) may be used instead.) As an example, the user 104 may be a customer, and the service provider associated with the customer care system 101 may be an insurance company. The user 104 may be calling the customer care system 101 to obtain balance information for his or her insurance policy. Moreover, the customer care system 101 may have a first language IVR that is capable of automatically communicating with the user 104 in a first human-spoken language (e.g., English) to provide the service of balance information to the user 104 without a human customer care agent. (Balance information is just an example; other forms of non-human necessitated services may be provided via the first language IVR 102.)

However, the user 104 in the foregoing example may speak Polish, not English, and is therefore unable to communicate effectively with the first language IVR 102. Further, the customer care system 101 may not have instant, or any, access to a Polish language interpreter. Even if the customer care system 101 had access to a Polish language interpreter, providing such access to the customer 104 would probably be a significant human resource expenditure for a service that would not necessitate human involvement (e.g., balance information) if the user 104 spoke English.

To obviate the need of obtaining a human language interpreter for a non-human necessitated service, or the need for significant changes to infrastructure to accommodate all other commonly spoken languages other than English, the simulated IVR configuration 100 has a second language simulated IVR 103. When the user 104 places a telephone call to the customer care system 101, the second language simulated IVR 103 appears to the user 104 to be an IVR that is communicating in his or her native language (e.g., Polish). Yet, in actuality, the second language simulated IVR 103 is not an IVR; rather, the second language simulated IVR 103 is a system that relies on communication, via a machine interpreter 107, with the existing first language IVR 102 of the customer care system 101 to provide the service. In other words, the first language IVR 102 continues to maintain service functionality (e.g., processing requests for non-human necessitated services, retrieving account information from an accounts database 108, etc.), whereas the second language simulated IVR 103 may not have any such service functionality by itself. In essence the second language simulated IVR 103 is a thin IVR that relies on the first language IVR 102 for robust functionality. As a result, the second language simulated IVR 103 reduces the computational complexity of the customer care system 101, which would otherwise have to build out full IVRs in multiple languages that each required significant processing power and storage space.

In one embodiment, the second language spoken by the user 104 is identified by the user 104 calling a dedicated communication channel, such as a dedicated telephone number (e.g., a one eight hundred telephone number). As a result, the customer care system 101 may determine which second language simulated IVR 103 should be utilized to provide the service to the user 104. In other words, the customer care system 101 may have, or be in communication with, multiple second language simulated IVRs 103, each corresponding to a different second language (e.g., Polish, German, French, etc.). Furthermore, a dedicated communication channel may be generated for each of the second languages. Accordingly, the customer care system 101 may identify the second language spoken by the user 104 according to the dedicated communication channel used to communicate with the customer care system 101, thereby determining which second language simulated IVR 103 should be selected. Alternatively, the same second language simulated IVR 103 may adapt to the identified second language to provide a service in that second language.

In one embodiment, the second language simulated IVR 103 is located within the customer care system 101. In an alternative embodiment, the second language simulated IVR 103 is remotely located from the customer care system 101 but is accessible by the customer care system 101 via a network 106.

After identifying the second language (e.g., Polish) and assigning the second language simulated IVR 103 to the telephone call, the customer care system 101 may begin the workflow by prompting the user 104 for account information (e.g., account number, telephone number, etc.) that identifies the user 104 to the customer care system 101; such prompts may be presented in the second language to the user 104. Other types of prompts (e.g., service requested) may also be presented throughout the workflow. In other words, the workflow occurring during a communication may involve a series of prompts to the user 104 and replies by the second language simulated IVR 103. For example, as illustrated in FIG. 1A, the customer care system 101 may utilize the first language IVR 102 to initiate a prompt for account information in a first language (e.g., English); rather than sending such prompt directly to the user 104, who may not be able to understand the prompt in English, the customer care system 101 routes the prompt through the network 106 to the machine interpreter 107. Moreover, the machine interpreter 107 sends an interpretation/translation of the prompt, via the network 106, to the second language simulated IVR 103 in the second language. (Alternatively, the customer care system 101 may have built-in functionality for the machine interpreter 107 that permits local access.) Finally, the second language simulated IVR 103 provides the prompt in the second language directly to the user 104 over the dedicated communication channel.

From the perspective of the user 104, a telephone call was placed via the dedicated communication channel, and a voice prompt in the second language (e.g., Polish) is automatically presented to the user 104. In other words, the user 104 is provided with the appearance of a Polish IVR providing prompts and responses. (Although the second language simulated IVR 103 may provide prompts, receive responses, and provide services in an audio-only format, a video format may also be utilized.)

Further, FIG. 1B illustrates a continuation of the example workflow illustrated in FIG. 1A. Upon receiving a prompt in the second language, the user 104 provides a response in the second language (e.g., via voice inputs, keypad inputs, gesture inputs, etc.) over the dedicated communication channel directly to the second language simulated IVR 103. The second language simulated IVR 103 then routes the response in the second language to the machine interpreter 107 via the network 106. Furthermore, the machine interpreter 107 performs a language interpretation/translation of the response, and forwards the interpreted/translated response in the first language to the first language IVR 102 via the network 106.

Upon receiving the response in the first language, the first language IVR 102 provides a service, as illustrated in FIG. 1C, through the network 106 to the machine interpreter 107. Further, the machine interpreter 107 interprets/translates the service and routes the interpreted/translated service in the second language to the second language simulated IVR 103, which may directly provide the service to the user 104 over the dedicated communication channel.

Although FIGS. 1A-1C illustrated one workflow sequence, multiple workflow sequences may be utilized by the customer care system 101 to provide a service, such as a non-human necessitated service, to the user 104. For example, the user 104 speaking Polish may want to obtain balance information for his or her insurance policy, and may have be prompted several times for various information to verity the account and identify of the user 104 prior to the second language simulated IVR 103 providing the balance information to the user 104 in Polish.

Figure 2A:
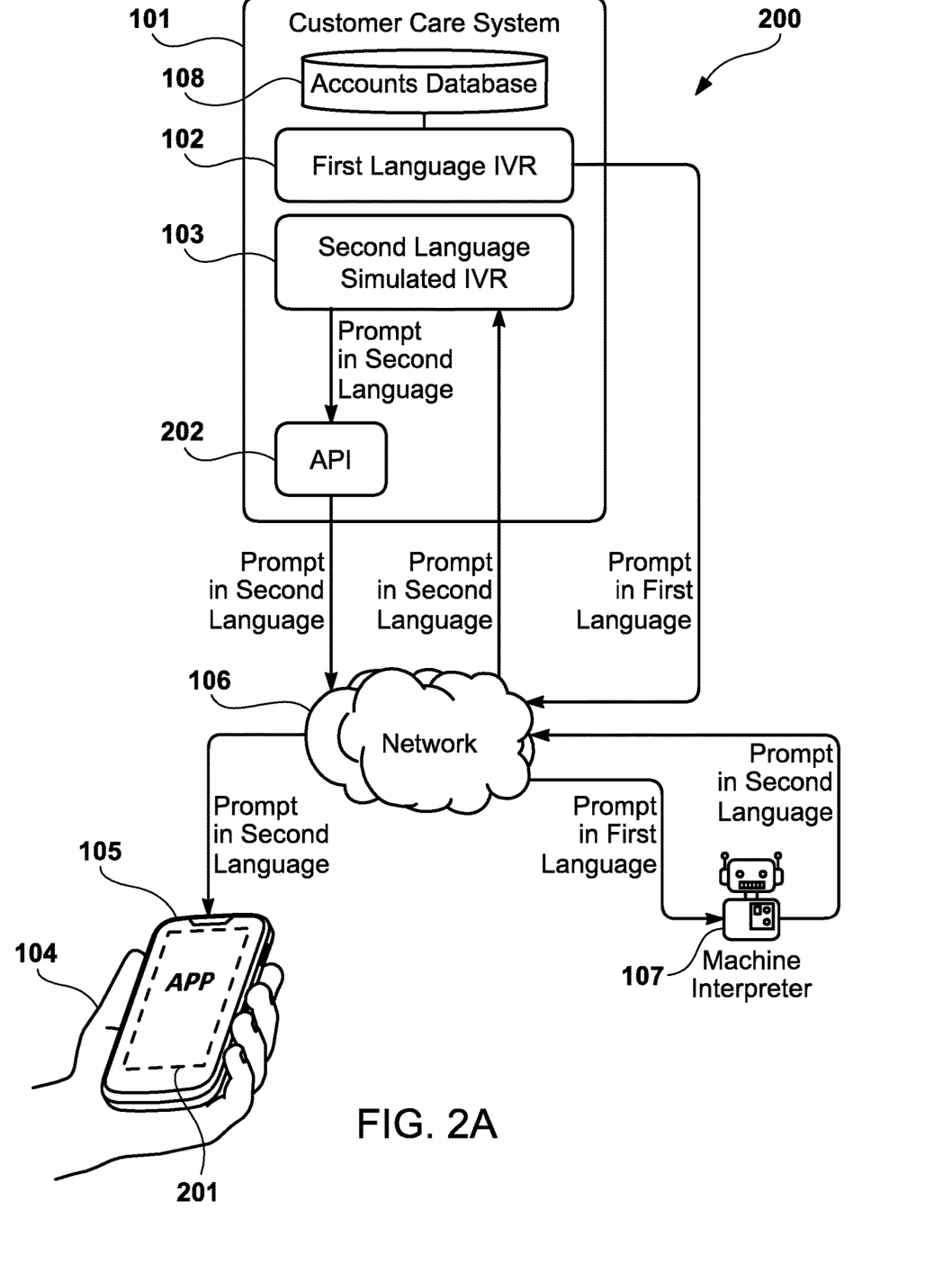
FIG. 2A illustrates the mobile computing device receiving a prompt in the second language, but with the dedicated communication channel being the application programming interface ("API") rather than a dedicated telephone number.
Figure 2B:
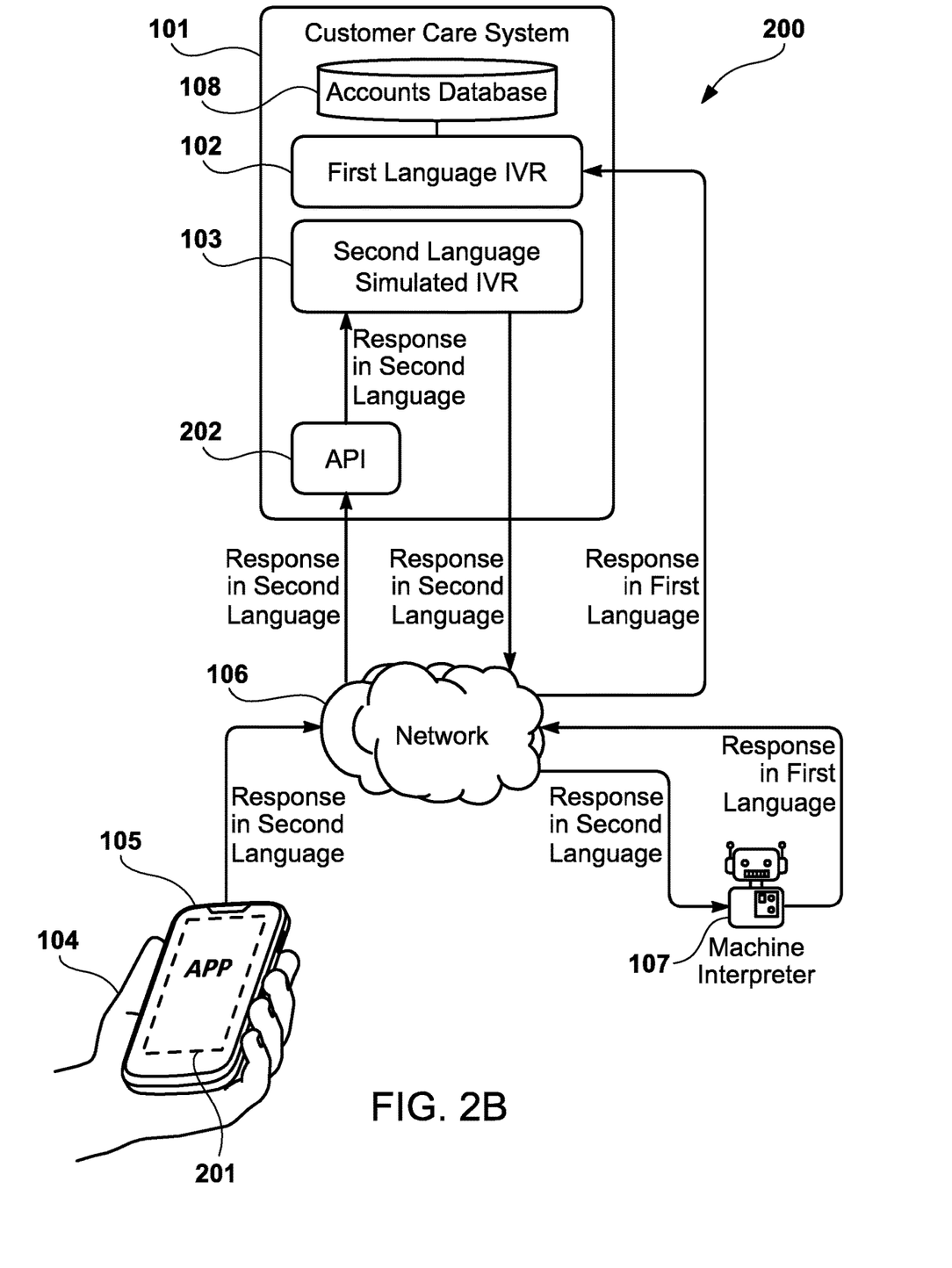
FIG. 2B illustrates the mobile computing device sending a response of the user via the API.
Figure 2C:
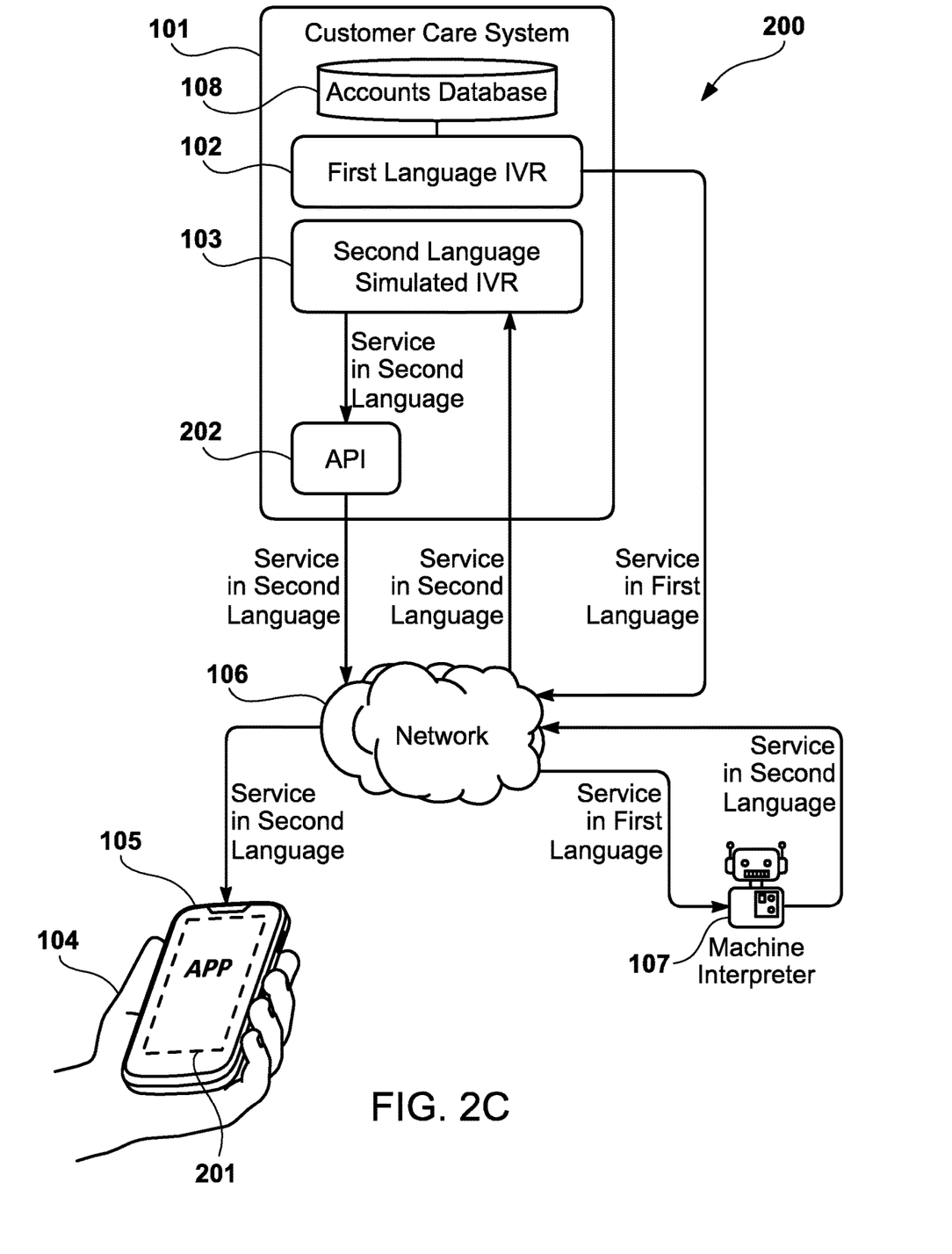
FIG. 2C illustrates the mobile computing device receiving a service from the second language simulated IVR via the API.

Although the dedicated communication channel illustrated in FIGS. 1A-1C is for a telephone number, alternative communication channels may be utilized instead. For example, FIGS. 2A-2C illustrate the communication channel being provided via an API 202 of a simulated IVR configuration 200. In other words, the customer care system 101 may have built-in functionality via the API 202 that may be externally accessed via the mobile computing device 105 (e.g., smartphone) of the user 104. As a result, the user 104 may utilize a software application 201 residing on his or her mobile computing device 105 to communicate with the second language simulated IVR 103 via the API 202. For example, the API 202 may have one or more functions that may be invoked via function calls by the software application 201. In one embodiment, the mobile computing device 105 may communicate with the API 202 via the network 106. Accordingly, the user 104 may place a telephone call via telephony module residing on the mobile computing device 105 and/or via the software application 201 stored in the mobile computing device 105.

Accordingly, FIG. 2A illustrates the mobile computing device 105 receiving a prompt in the second language, but with the dedicated communication channel being the API 202 rather than a dedicated telephone number. Furthermore, FIG. 2B illustrates the mobile computing device 105 sending a response of the user 104 via the API 202. Finally, FIG. 2C illustrates the mobile computing device 105 receiving a service from the second language simulated IVR 103 via the API 202.

Figure 3:
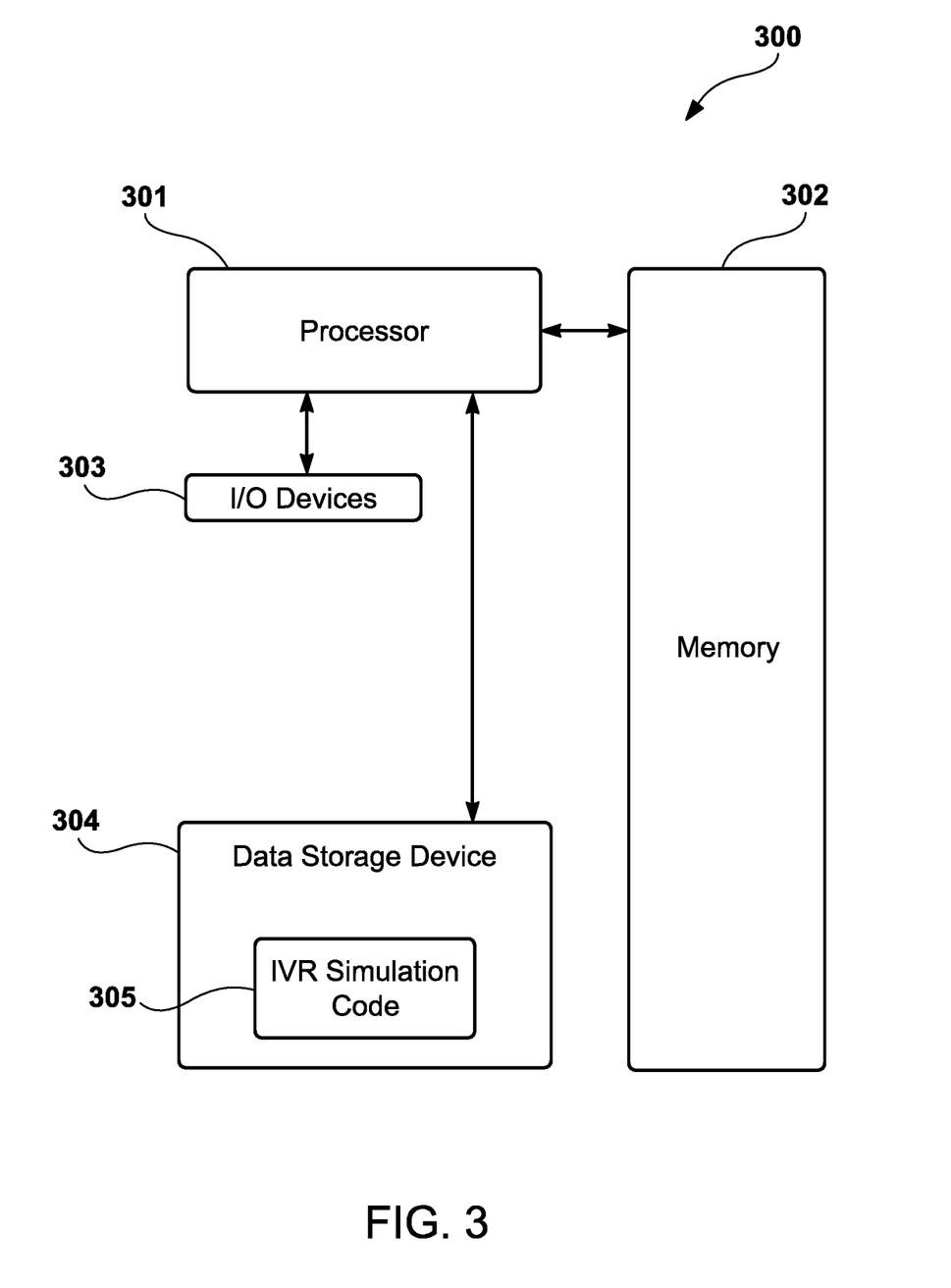
FIG. 3 illustrates a system configuration that may be used to implement the simulated IVR configuration illustrated in FIGS. 1A-1C or the simulated IVR configuration illustrated in FIGS. 2A-2C.

FIG. 3 illustrates a system configuration 300 that may be used to implement the simulated IVR configuration 100 illustrated in FIGS. 1A-1C or the simulated IVR configuration 200 illustrated in FIGS. 2A-2C. The system configuration 300 has a processor 301 that is in operable communication with a memory device 302, one or more input/output ("I/O") devices 303, and a data storage device 304. Further, the processor 301 loads various code (e.g., IVR simulation code 305) from the data storage device 304 into the memory device 302.

The processor 301 may be a specialized processor that utilizes the IVR simulation code 305 to generate the second language simulated IVR 103 illustrated in FIGS. 1A-1C and 2A-2C.

Figure 4:
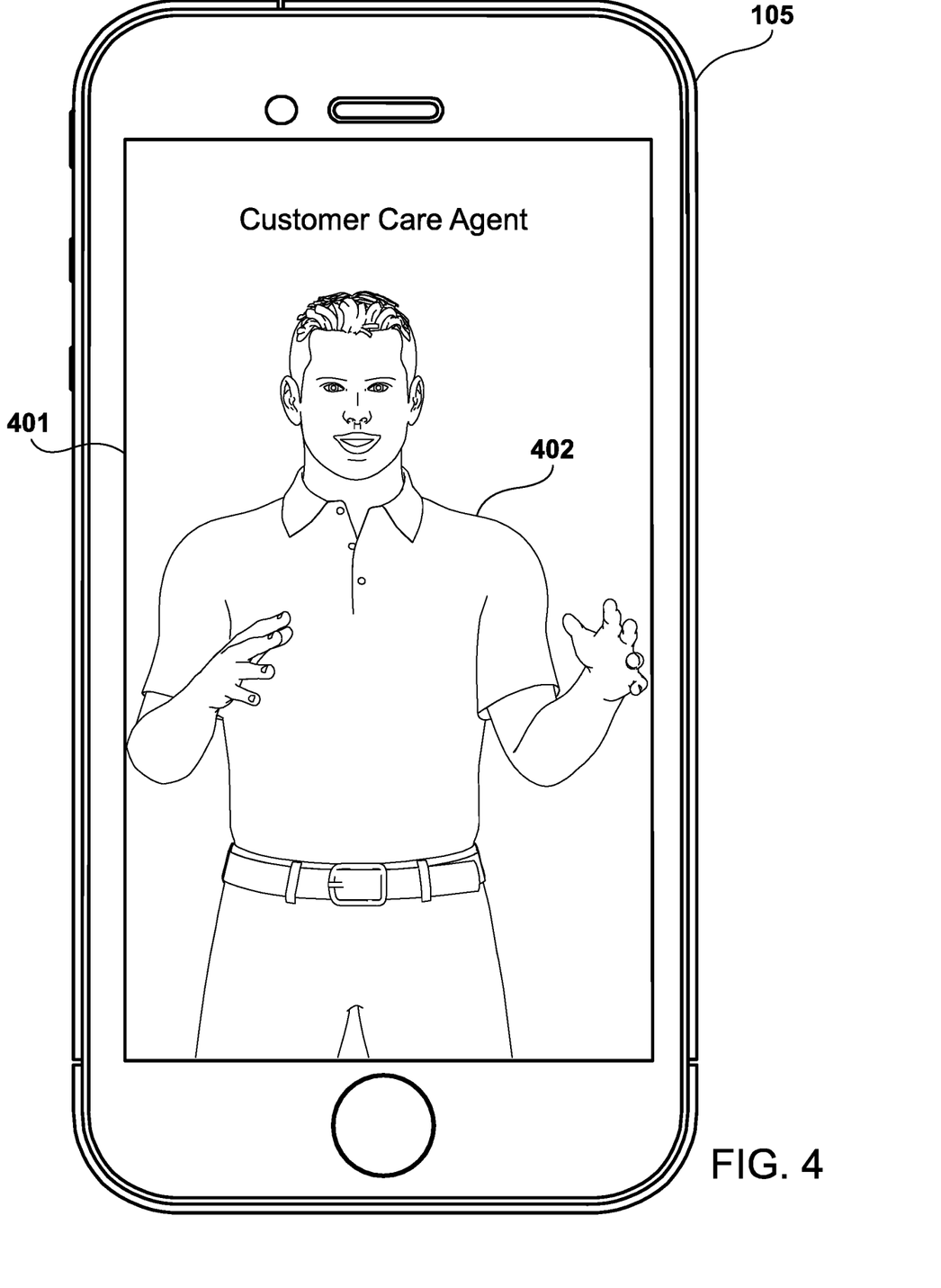
FIG. 4 illustrates the mobile computing device with a display screen that displays an avatar corresponding to the second language simulated IVR or the customer care agent.

Moreover, in one embodiment, imagery may be displayed on the mobile computing device 105 to correspond to the second language simulated IVR 103. The imagery may be manipulated in a variety of ways to personalize the second language simulated IVR 103. For example, FIG. 4 illustrates the mobile computing device 105 with a display screen 401 that displays an avatar 402 corresponding to the second language simulated IVR 103. For instance, the avatar 402 is manipulated to have lip movements corresponding to the interpreted/translated words in Polish. As another example, certain gestures or phrases may be associated with certain phrases in English, but are visually displayed as would be understood by the user 104 as corresponding to the interpreted/translated language in Polish. (The imagery is not limited to the avatar 402; other imagery (e.g., pictures, service provider brand indicia, etc.) may be used instead.)

Figure 5:
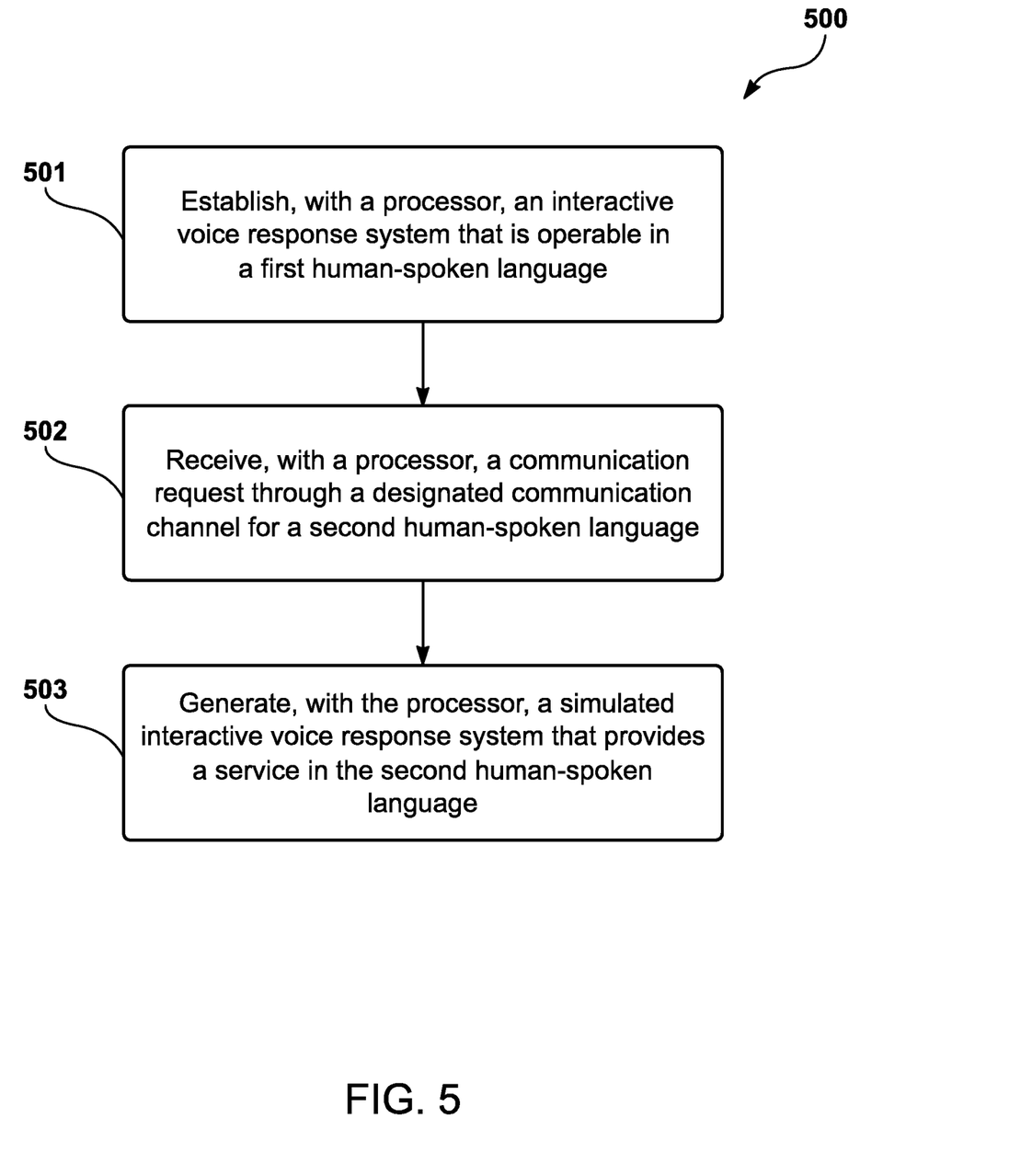
FIG. 5 illustrates a process that may be utilized by the simulated IVR configuration to generate a simulated IVR experience.

FIG. 5 illustrates a process 500 that may be utilized by the simulated IVR configuration 100 to generate a simulated IVR experience. At a process block 501, the process 500 establishes, with the processor 301, the first language IVR system 102, illustrated in FIG. 1, that is operable in the first human-spoken language. Moreover, at a process block 502, the process 500 receives, with the processor 301, a communication request through a designated communication channel for the second human-spoken language. The second human-spoken language is distinct from the first human-spoken language.

Further, at a process block 503, the process 500 generates, with the processor 301, the simulated IVR system 103, that provides a service in the second human-spoken language. The simulated IVR system 103 routes a request in the second human-spoken language to the machine interpreter 107 that translates the request into the first human-spoken language. The translated request is provided to the IVR system to process the request in the first human-spoken language. The processed request is translated by the machine interpreter 107 for output by the simulated IVR system 103 as the service in the second human-spoken language.

In one embodiment, the language interpretation service provided for herein may be implemented via a voice-based communication. In another embodiment, the language interpretation service provided for herein may be implemented via a text-based communication (e.g., a chat session). In yet another embodiment, the language interpretation service provided for herein may be implemented via an image-based communication (e.g., for sign language detection via image capture rather than audio capture). Finally, the language interpretation service may implement a combination of the foregoing types of communication.

A computer is herein intended to include any device that has a general, multi-purpose or single purpose processor as described above. For example, a computer may be a PC, laptop computer, set top box, cell phone, smartphone, tablet device, smart wearable device, portable media player, video player, etc.

It is understood that the apparatuses described herein may also be applied in other types of apparatuses. Those skilled in the art will appreciate that the various adaptations and modifications of the embodiments of the apparatuses described herein may be configured without departing from the scope and spirit of the present computer apparatuses. Therefore, it is to be understood that, within the scope of the appended claims, the present apparatuses may be practiced other than as specifically described herein.

We claim:

1. A computer program product comprising a computer readable storage device having a computer readable program stored thereon, wherein the computer readable program when executed on a computer causes the computer to:

establish, with a processor, an interactive voice response system that is operable in a first human-spoken language;

receive, with the processor, a communication request through a designated communication channel for a second human-spoken language, the second human-spoken language being distinct from the first human-spoken language; and generate, with the processor, a simulated interactive voice response system that provides a service in the second human-spoken language, the simulated interactive voice response system routing a request in the second human-spoken language to a machine interpreter that translates the request into the first human-spoken language, the translated request being provided to the interactive voice response system to process the request in the first human-spoken language, the processed request being translated by the machine interpreter for output by the simulated interactive voice response system as the service in the second human-spoken language, the simulated interactive voice response system being distinct from the interactive voice systems;

wherein the computer is further caused to generate an avatar, corresponding to the simulated interactive voice response system, that presents the service in the second human-spoken language via one or more virtual lip movements.

2. The computer program product of claim 1, wherein the designated communication channel is a dedicated telephone number.

3. The computer program product of claim 1, wherein the designated communication channel is an Application Programming Interface.

4. The computer program product of claim 1, wherein the request is for account information.

5. The computer program product of claim 1, wherein the translated request is performed automatically by the interactive response system without any human customer care agent interaction.

6. The computer program product of claim 1, wherein the interactive voice response system accesses a database that stores non-human necessitated data.

7. A method comprising:

establishing, with a processor, an interactive voice response system that is operable in a first human-spoken language;

receiving, with the processor, a communication request through a designated communication channel for a second human-spoken language, the second human-spoken language being distinct from the first human-spoken language; and generating, with the processor, a simulated interactive voice response system that provides a service in the second human-spoken language, the simulated interactive voice response system routing a request in the second human-spoken language to a machine interpreter that translates the request into the first human-spoken language, the translated request being provided to the interactive voice response system to process the request in the first human-spoken language, the processed request being translated by the machine interpreter for output by the simulated interactive voice response system as the service in the second human-spoken language, the simulated interactive voice response system being distinct from the interactive voice systems;

wherein the processor is further caused to generate an avatar, corresponding to the simulated interactive voice response system, that presents the service in the second human-spoken language via one or more virtual lip movements.

8. The method of claim 7, wherein the designated communication channel is a dedicated telephone number.

9. The method of claim 7, wherein the designated communication channel is an Application Programming Interface.

10. The method of claim 7, wherein the request is for account information.

11. The method of claim 7, wherein the translated request is performed automatically by the interactive response system without any human customer care agent interaction.

12. The method of claim 7, wherein the interactive voice response system accesses a database that stores non-human necessitated data.

13. A system comprising:

an interactive voice response device that is operable in a first human-spoken language;

a receiver that receives a communication request through a designated communication channel for a second human-spoken language, the second human-spoken language being distinct from the first human-spoken language; and a processor that generates a simulated interactive voice response system that provides a service in the second human-spoken language, the simulated interactive voice response system routing a request in the second human-spoken language to a machine interpreter that translates the request into the first human-spoken language, the translated request being provided to the interactive voice response system to process the request in the first human-spoken language, the processed request being translated by the machine interpreter for output by the simulated interactive voice response system as the service in the second human-spoken language, the simulated interactive voice response system being distinct from the interactive voice systems;

wherein the processor is further caused to generate an avatar, corresponding to the simulated interactive voice response system, that presents the service in the second human-spoken language via one or more virtual lip movements.

14. The system of claim 13, wherein the designated communication channel is a dedicated telephone number.

15. The system of claim 13, wherein the designated communication channel is an Application Programming Interface.

16. The system of claim 13, wherein the request is for account information.

17. The system of claim 13, wherein the translated request is performed automatically by the interactive voice response device without any human customer care agent interaction.

18. The system of claim 13, wherein the interactive voice response system accesses a database that stores non-human necessitated data.

* * * * *